United States Patent [19]

Coffey

[11] 4,203,335

[45] May 20, 1980

[54] DEVICE TO FEED A RIBBON OF SAUSAGE SUPPORT LOOPS INTO CLIP ATTACHMENT APPARATUS

[75] Inventor: Rufus G. Coffey, Hazelwood, N.C.

[73] Assignee: Rheem Manufacturing Company, New York, N.Y.

[21] Appl. No.: 921,251

[22] Filed: Jul. 3, 1978

[51] Int. Cl.² .......................... B26D 5/20; B65H 17/40
[52] U.S. Cl. ........................................ 83/232; 83/278; 226/62
[58] Field of Search .......................... 83/232, 278, 277; 226/62, 64, 65, 67, 68

[56] References Cited

U.S. PATENT DOCUMENTS

| | | | |
|---|---|---|---|
| 691,883 | 1/1902 | Zucker | 83/278 X |
| 1,202,107 | 10/1916 | Schmid | 226/67 |
| 1,318,108 | 10/1919 | Ray | 226/67 X |
| 1,403,106 | 1/1922 | Pittman | 226/67 |
| 1,860,144 | 5/1932 | Gaisman et al. | 226/67 |
| 2,746,543 | 5/1956 | Gezich | 83/278 X |
| 3,326,441 | 6/1967 | Graves | 226/67 |
| 3,410,466 | 11/1968 | Harris | 226/67 X |

*Primary Examiner*—J. M. Meister
*Attorney, Agent, or Firm*—Allegretti, Newitt, Witcoff & McAndrews

[57] ABSTRACT

A device for feeding a ribbon of sausage support loops into a clip attachment apparatus is attached to the clip attachment apparatus and includes a body member with a guide track for directing the ribbon of loops from a storage reel to the clip apparatus. A reciprocating piston operated drive pin engages the ribbon to incrementally drive the ribbon forward into position for attachment of a single loop to a sausage casing. A knife separates the single loop from the ribbon upon attachment of the loop to the sausage casing by the clip apparatus. Subsequently, the drive pin is disengaged from the ribbon and is reversibly driven into position for re-engagement and further advancement of the ribbon. The movement of the drive pin and knife is controlled by a cam track in the body member.

6 Claims, 8 Drawing Figures

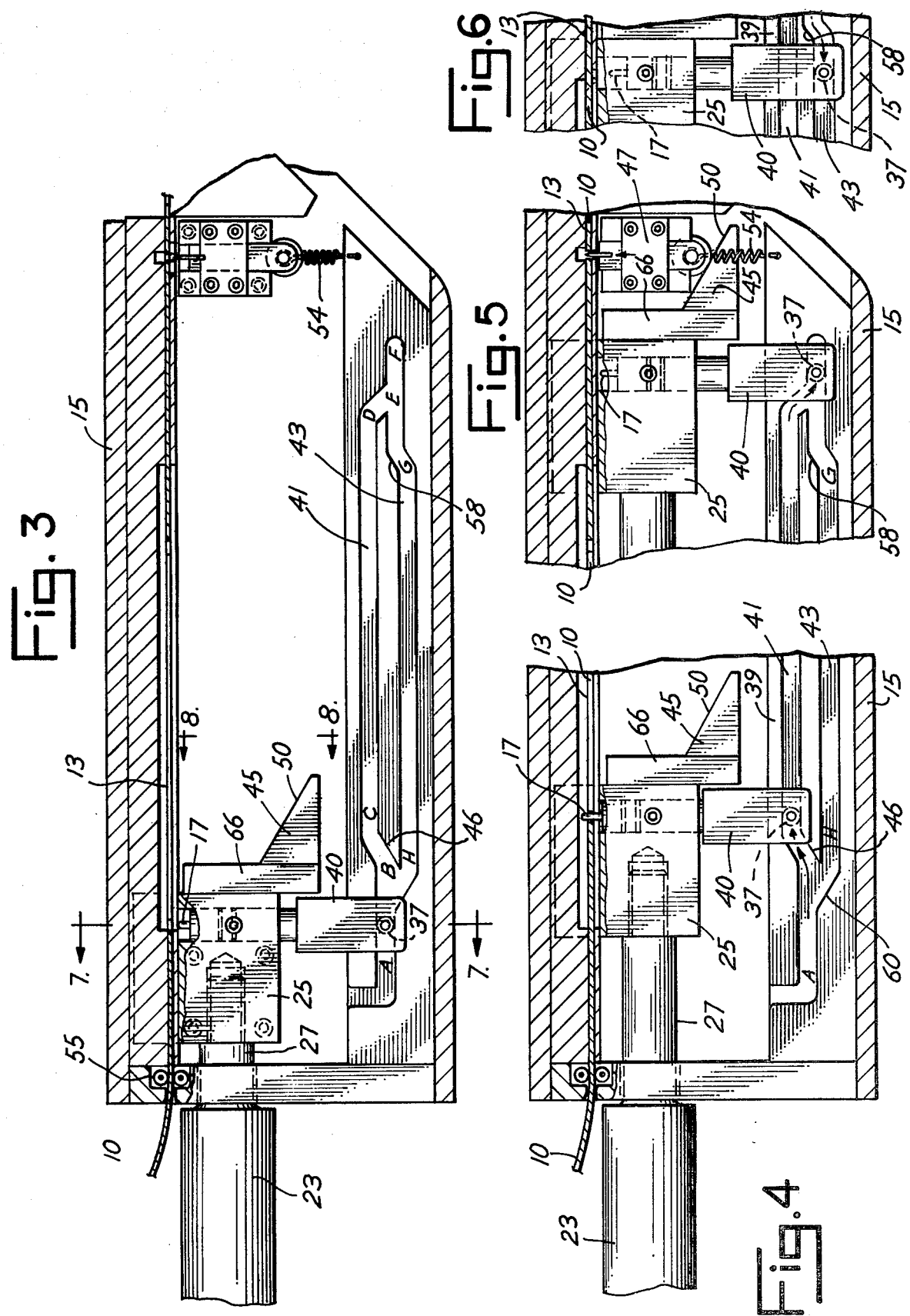

4,203,335

DEVICE TO FEED A RIBBON OF SAUSAGE SUPPORT LOOPS INTO CLIP ATTACHMENT APPARATUS

BACKGROUND OF THE INVENTION

The present invention relates to a device for automatically feeding a ribbon of connected sausage loop hangers to a clip attachment apparatus which attaches individual loop hangers to individual sausage casings.

Sausages and other meats are often filled in a casing material which is sealed or tied at opposite ends. Typically the casing ends are fastened by a metal clip. It is known to bind a loop of string or the like to the casing by means of the metal clip simultaneously with attachment of the clip to the casing. The loop of string is thereafter available to hang the sausage for processing or display.

Placement of a string or other sausage support member on the end of a sausage casing simultaneous with attachment of a metal clip has heretofore been accomplished generally by a manual process. The string or support member is typically manually positioned on the end of the casing prior to attachment of a clip.

Recently it has been suggested that a ribbon of sausage support loops may be used in combination with a clip attachment apparatus. This is disclosed by Donald Ernst in application Ser. No. 739,939, filed Nov. 8, 1976 which is incorporated herein by reference. To utilize such a continuous ribbon of connected sausage support loops may require manual positioning of individual loops. Since the loops, as disclosed by Ernst, are connected in the form of a continuous ribbon, the individual loops must be cut or separated from each other in order to be useful.

Ernst also suggested that positioning and separating the individual loops could be accomplished by mechanical means. The present invention constitutes such a mechanical device.

SUMMARY OF THE INVENTION

In a principal aspect, the device of the present invention comprises a mechanism for feeding a continuous ribbon of individual, connected sausage loops to a clip apparatus and for separating an individual loop from the ribbon upon proper positioning of the individual loop with respect to the clip apparatus. The device includes a body member having a guide track for the ribbon. A reciprocating pin member is adapted to engage the ribbon and drive it in the track forward to a desired position. The pin member then returns to an original ribbon drive position. A cam track and follower mechanism control the movement of the pin member. A ribbon storage reel may be mounted on the body member. In the preferred embodiment, a reciprocating air driven piston is connected to the pin member for driving the pin member along the track.

Thus, it is an object of the present invention to provide a device which is capable of rapidly feeding a ribbon of connected, individual sausage loop tie members to a sausage clip attaching apparatus.

Still a further object of the present invention is to provide a device for feeding a ribbon of attached loop members to a clip attachment device by means of a reciprocating drive pin member adapted to engage the ribbon in a guide track.

Another object of the present invention is to provide a device for feeding a ribbon of attached loop members which is mechanically reliable, easily repairable and easily incorporated with existing clip attachment apparatus.

A further object of the present invention is to provide a device which separates individual loop members from a ribbon of connected loop members.

It is a further object of the present invention to provide a device which will mechanically feed a ribbon of loop material at speeds which are as fast as the preferred operating speed of a clip attachment apparatus.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 3 is an enlarged side cross-sectional view of the loop feed device of the present invention;

FIG. 4 is a partial side cross-sectional view similar to FIG. 2 wherein the feed mechanism is beginning to feed the ribbon;

FIG. 5 is a partial side cross-sectional view similar to FIG. 2 wherein the feed mechanism is beginning to cut the ribbon;

FIG. 6 is a partial side cross-sectional view similar to FIG. 2 wherein the feed mechanism begins a return to an original ribbon feed position;

DESCRIPTION OF THE PREFERRED EMBODIMENT

Figure 1:
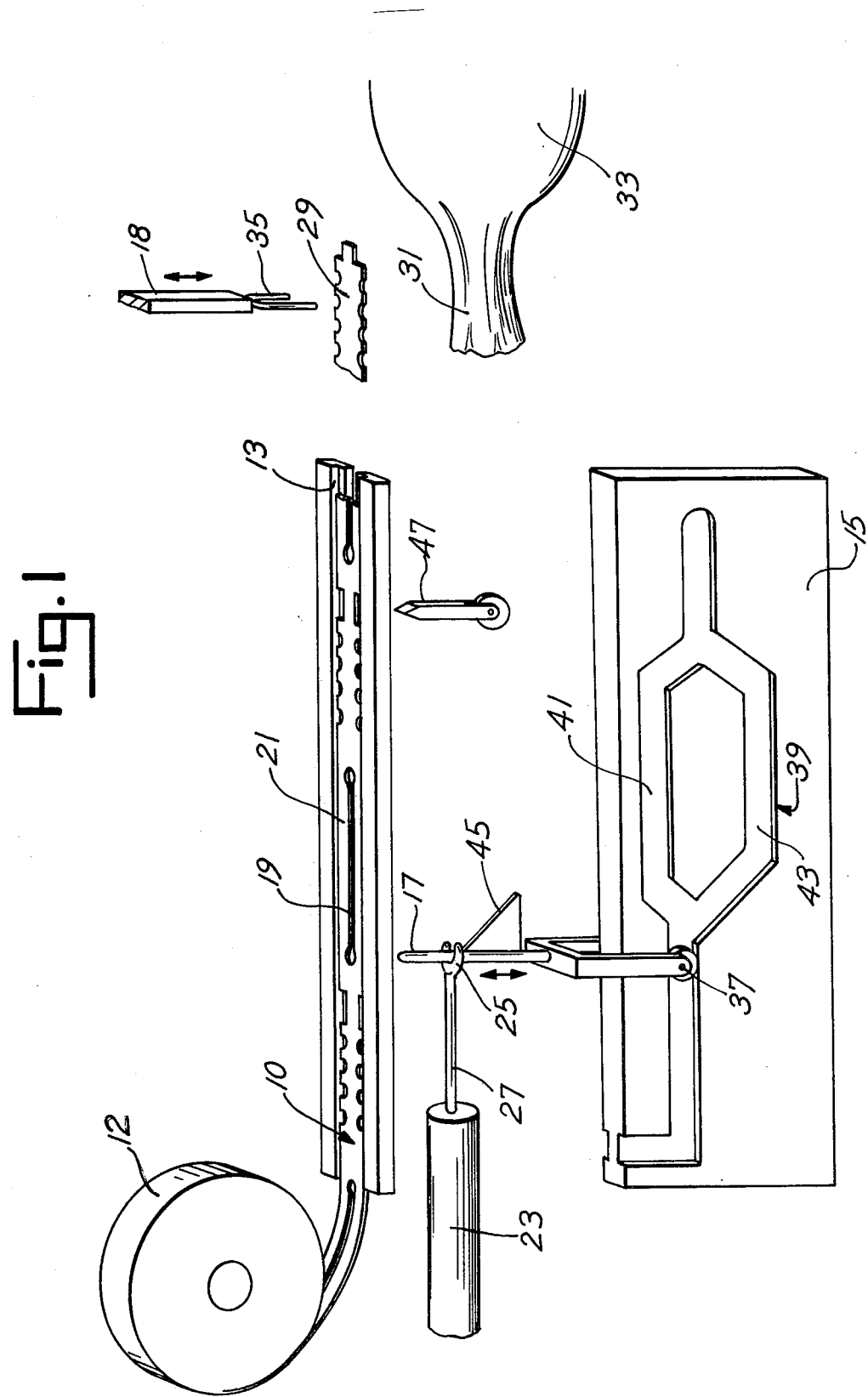
FIG. 1 is a schematic perspective view illustrating a ribbon of sausage loop members positioned by the feed device of the invention relative to a clip attachment apparatus.

FIG. 1 schematically illustrates the device of the invention. There, a ribbon 10 of connected, Mylar sausage loops of the type disclosed in the referenced Ernst application is fed from a reel 12, along a guide track 13 of body member 15 to a clip attachment apparatus 18. The ribbon 10 is incrementally fed by operation of a ribbon guide pin 17, which engages an opening 19 in a loop 21 of ribbon 10. A piston 23 having yoke carrier 25 attached to a reciprocating piston rod 27 drives the pin 17 longitudinally along track 13. The stroke of rod 27 is set to provide overtravel for ribbon severence. The cam tract 39 insures precise advancement of ribbon 10 toward clip attachment apparatus 18 and positioning of an end 29 of a loop such as loop 21 over the end 31 of sausage casing 33 so that a clip 35 may be attached simultaneously around the casing end 31 and loop end 29.

The movement of pin 17 into engagement with opening 19 is controlled by a follower pin 37 attached to pin 17 and guided by cam track 39. The follower 37 is directed by upper run 41 of track 39 during forward movement of the rod 27. The follower 37 is directed by lower run 43 of track 39 during reverse movement of the rod 27, causing the pin 17 to be repositioned for movement along upper run 41. A cam wedge 45. Attached to follower 37, engages a knife 47 at the forward end of run 41 to cause the knife 47 to sever a single loop 21 from ribbon 10 as the loop 21 is fed into position with respect to clip attachment apparatus 18. As described, the device cycles in response to reciprocating operation of piston 23 to extend and retract rod 27.

Figure 2:
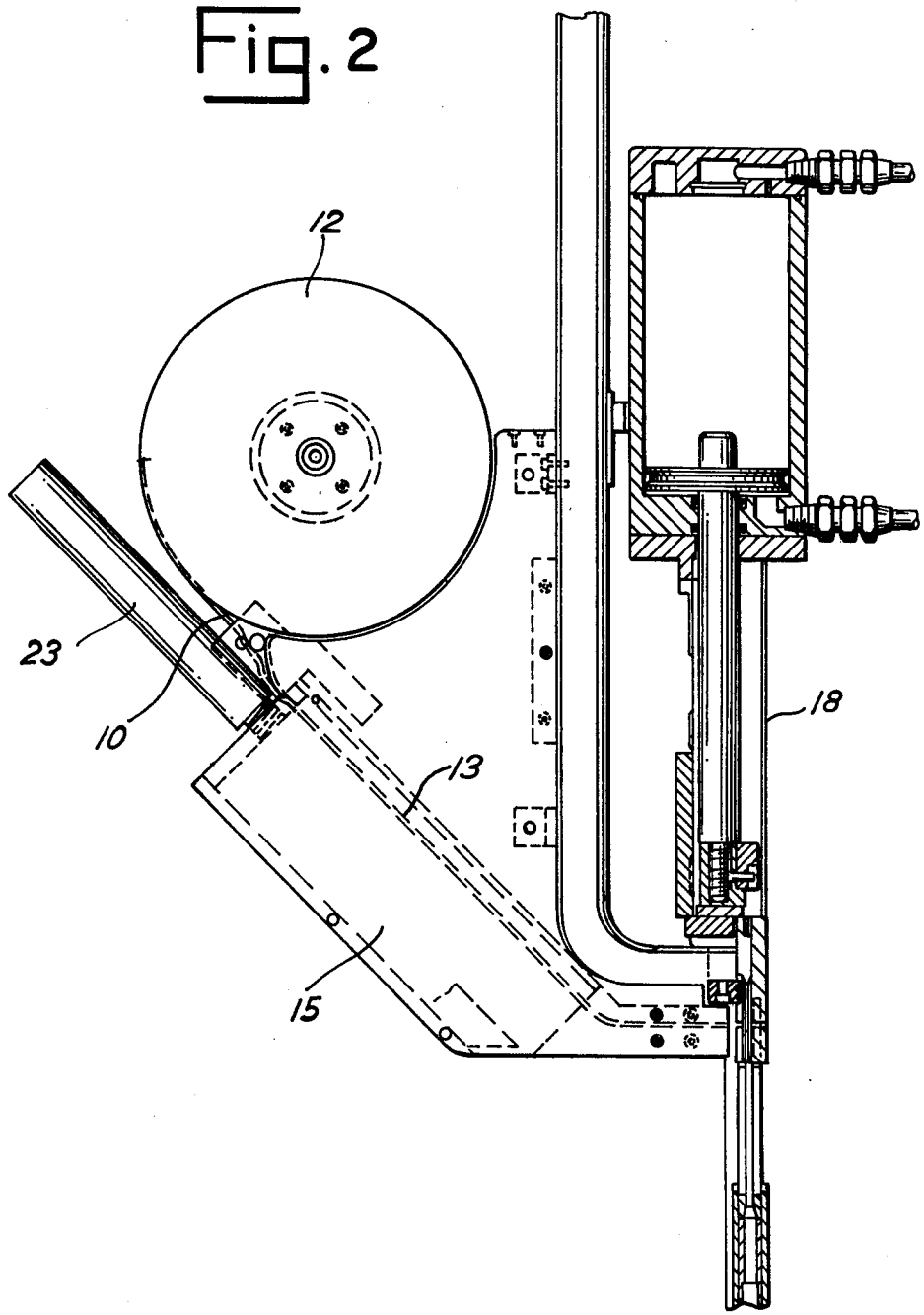
FIG. 2 is a side elevational view of the feed device of the invention in combination with a typical clip attachment apparatus.

FIG. 2 is a horizontal view of the apparatus shown in FIG. 1. The reel 12 is mounted on the body member 15 near the guide track 13. The ribbon 10 is fed to the guide track 13 in member 15. Piston 23 is also mounted on the member 15 adjacent the reel 12. The clip attachment apparatus 18 is positioned adjacent the opposite end of member 15 to receive the individual loops 21.

Figure 7:
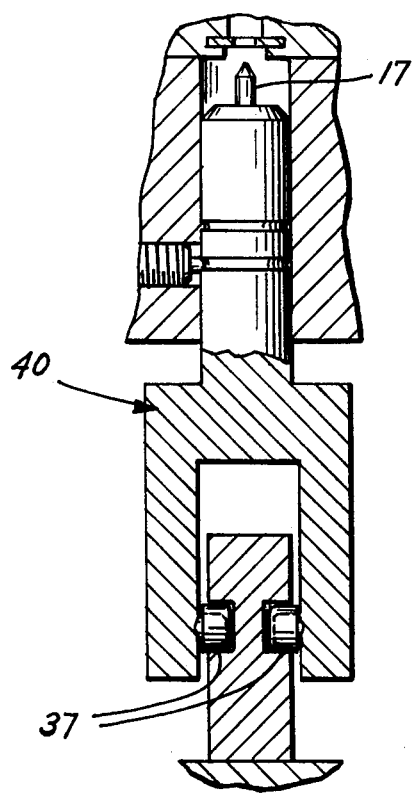
FIG. 7 is a horizontal cross-sectional view of the yoke member shown in FIG. 3 taken along the line 7—7.

Referring to FIG. 3, the cam track 39 is defined within the member 15. The cam track 39 comprises grooves in member 15, including an upper or forward run 41 and a lower or reverse run 43. A yoke 40 is mounted over the cam track 39. A follower pin 37 projects from yoke 40 into the cam track 39 to insure movement of the yoke 40 along the cam track 39. When the yoke 40 is in a null or initial position, the ribbon guide pin 17, associated with the yoke 40, is positioned adjacent and just below the guide track 13 and the ribbon 10. The yoke 40, ribbon guide pin 17 and follower pin 37 are shown in FIG. 7.

As shown in FIG. 3, the cam track 39 has a number of connected segments, AB, BC, CD, DE, EF, EG, GH and HB. Segments AB and CD define a path along forward run 41 for movement of guide pin 17 from the null to the advance or projected position and segments EG, GH, HB and BA define a path along reverse run 43 for movement of the guide pin 44 from the advance to the null position. Segments BC and DE are, preferably at least partially transverse to the forward run 41 to define segments which cause engagement and disengagement, respectively, of the guide pin 17 from ribbon 10. Segment EF defines a run associated with cutting of the ribbon 10 into individual loops.

Referring to FIG. 4, as yoke 40 is moved forward along segment AB, the follower pin 37 engages an inclined surface 46 of the cam track 39 and raises the yoke 40 along segment BC. Raising of the yoke 40 causes the guide pin 17 to project into the guide track 13 and engage the opening 19 in ribbon 10 as shown in FIG. 1.

Continued forward movement of yoke 40 along segment CD advances the ribbon 10 in track 13 to a preselected advance or delivery position. As yoke 40 is moved still farther forward, the yoke 40 follows segment DE so that the guide pin 17 disengages the ribbon opening 19 as shown in FIG. 5.

As yoke 40 is moved forward along segment EF, a knife drive wedge or actuator 45 having an inclined plane 50 is driven into contact with ribbon knife 47. Knife 47 is mounted transverse to track 13 and is normally biased by a spring 54 to a position which is retracted from the ribbon path in track 13, as shown in FIG. 2. Forward movement of yoke 40 along segment EF causes wedge 45 to engage the lower edge of knife 47 forcing the knife 47 upward to intersect and cut ribbon 10 in track 13, as shown in FIG. 5. The length of the various runs of track 13 is selected so that a single loop 21 of ribbon 10 is advanced by movement of yoke 40 to provide cutting by knife 47 precisely at the connecting web between adjacent loops 21. The individual loop 21 is then attached by the clip attachment apparatus 18 of FIG. 2 to the sausage casing 33 as previously explained.

Figure 8:
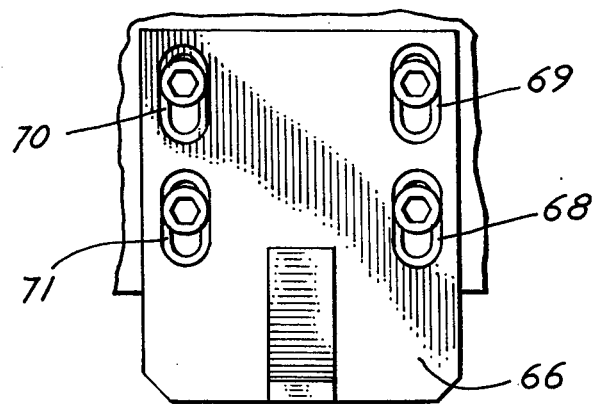
FIG. 8 is a horizontal plan view of the plate portioner for the ribbon cut off taken along the line 8—8 in FIG. 3.

In preferred form, the knife actuator 45 is attached to the yoke carrier 25 by a plate 66 as shown in FIG. 8. The plate 66 includes four "C" bores 68, 69, 70 and 71 and is screwed to the yoke carrier 25 by conventional machine screws inserted through the "C" bores and received by threads in the yoke carrier 25. The "C" bores permit the height of the actuator 45 to be adjusted so that the blade of knife 47 makes proper contact to separate the individual loop 21 from the ribbon 10.

As the movement of yoke 40 is reversed along segment FE, the actuator 45 disengages from contact with the knife 47 permitting spring 54 to return the knife 47 to its normally recessed position. As yoke 40 is further reversed along segment EG the yoke 40 is guided or lowered by an inclined surface 58 into the reverse run 43 so that pin 17 will remain disengaged from the ribbon 10. The segment GH is sufficiently below the height of segment AB so that inclined surface 46 passes completely through the plane of segment AB, thus permitting surface 46 to engage following pin 37 and to raise guide pin 17 into the engaged position upon forward movement of piston rod 27.

As yoke 40 is reversed still farther along segment GH and HB, an inclined surface 60 raises yoke 40 to the level of segment BA. The yoke 40 is finally reversed along segment BA until it has reached its initial or null position. The cycle of movement along the forward run 41 and reverse run 43 is thereafter repeated so that another individual loop 21 is delivered to the clip attachment apparatus 18 at the advance or delivery position.

The forward and reverse movement of yoke 40 is provided by the reciprocating piston 23 inserted through body member 15 as shown in FIG. 3, and attached to the yoke 40 by a yoke carrier 25, as previously explained and shown in FIG. 1. The piston 23 is driven in a conventional manner by a compressed air source, not shown, and not necessary to an understanding of this invention.

The piston 23, yoke 40 and cam track 39 thus cooperate to define an apparatus for converting the one dimensional motion of piston 23 into the two dimensional direction necessary to selectively engage, advance and disengage the ribbon 29. The piston 23, yoke 40, cam track 39, knife actuator 45 and knife 47 cooperate to define an apparatus for selectively separating the individual loops 21 from the ribbon 10 in a position where the loop 21 are then received by the clip attachment apparatus 18.

The above description relates to a preferred embodiment of the invention. The preferred configuration is described and illustrated in the drawing. However, alternative configurations are possible within the scope of the invention. For example, the actuator member 45 may be mounted near the knife 47 and detached from the yoke 40, yet still act in cooperation with the yoke 40 and knife 47 to cut loop 21 from ribbon 10. The device of the invention may include a friction apparatus, such as rollers 55 shown in FIG. 3, to engage the ribbon 10 to prevent undesired movement, for example, from the momentum of the roll 12. The cam track 39 may have runs 41, 43 of different configuration than those shown in the preferred embodiment. For example, the angle of the various inclined surfaces 46, 50, 58 and 60 may vary in degree depending in part upon the rate of operations of the piston 23. Reciprocating movement may be provided to the yoke 40 by an operating other than a piston. Yet none of these modifications will vary from the concept of this invention. Therefore, the subject matter of the invention is to be limited only by the following claims and their equivalents.

What is claimed is:

1. A device for feeding a continuous ribbon of individual sausage loops to a clip attachment apparatus, comprising, in combination:
   a body member, said body member including a guide track for the ribbon;
   a movable ribbon guide pin member mounted in the body member;
   a follower connected to the guide pin member;
   a cam track defined in the body member, said track having a run for movement of the pin from a null position to a ribbon engagement and subsequent advance position and a separate connected run for ribbon disengagement and pin member movement from the advance to the null position; and
   reciprocating drive means for incrementally driving the pin member follower and engaged ribbon in run of the cam track between the null position and the advance position for advancing the ribbon into the clip attachment apparatus and for driving the follower in the connected run for disengaging the pin member from a ribbon when the pin member is retracted from the null position to the advance position.

2. The device of claim 1 including a ribbon reel attached to the body member for storage and feeding of the ribbon to the guide track.

3. The device of claim 1 including a ribbon knife in the body member actuated in response to movement of the pin member to the advance position to sever an individual loop from the ribbon.

4. The device of claim 1 including a knife transverse to the guide track and wherein said follower includes a drive wedge for engaging the knife when in the advance position to translate the knife into the ribbon and thereby cut the ribbon.

5. The device of claim 1 including friction means for engaging the ribbon during movement to the advance position.

6. A device for feeding a continuous ribbon of individual sausage loops to a clip attachment apparatus and for subsequently separating an individual sausage loop from the ribbon upon feeding and positioning the ribbon with respect to the clip attachment apparatus, comprising, in combination:
   a body member including a guide track for the ribbon;
   a movable ribbon guide pin member mounted in the body member;
   a follower and cam track for positioning the pin member transversely to the guide track into and out of engagement with a ribbon in the guide track;
   reciprocating drive means for driving the pin member and engaged ribbon in the guide track between a null position and an advance position to engage and advance the ribbon to a clip attachment apparatus and between an advance position and a null position to disengage the pin member from the ribbon; and
   a knife mounted transversely to the track, said follower including means for engaging the knife in the advance position and for translating the knife to cut the ribbon.

* * * * *